US011757912B2

United States Patent
Udupi Raghavendra et al.

(10) Patent No.: US 11,757,912 B2
(45) Date of Patent: *Sep. 12, 2023

(54) DEEP PACKET ANALYSIS

(71) Applicant: Kyndryl, Inc., New York, NY (US)

(72) Inventors: Arjun Udupi Raghavendra, Zurich (CH); Tim Uwe Scheideler, Schoenenberg (CH); Matthias Seul, Pleasant Hill, CA (US)

(73) Assignee: KYNDRYL, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,798

(22) Filed: Dec. 20, 2022

(65) Prior Publication Data

US 2023/0118136 A1 Apr. 20, 2023

Related U.S. Application Data

(63) Continuation of application No. 16/856,429, filed on Apr. 23, 2020, now Pat. No. 11,563,761.

(51) Int. Cl.
*H04L 9/40* (2022.01)
*G06F 21/53* (2013.01)
(Continued)

(52) U.S. Cl.
CPC .......... *H04L 63/1425* (2013.01); *G06F 21/53* (2013.01); *H04L 41/14* (2013.01);
(Continued)

(58) Field of Classification Search
CPC ..... H04L 63/1425; H04L 47/31; H04L 47/32; H04L 49/9005; H04L 1/1887; H04L 41/14; G06F 21/53
See application file for complete search history.

(56) References Cited

U.S. PATENT DOCUMENTS 9,225,647 B2 12/2015 Manuguri et al.
9,240,938 B2 1/2016 Dimond et al.
(Continued)

FOREIGN PATENT DOCUMENTS

CN 105718792 6/2016
CN 106055975 10/2016
(Continued)

OTHER PUBLICATIONS

IBM Developer, "Know your TCP system call sequences", Nov. 6, 2007 (accessed on Feb. 21, 2020], 8 pages, Retrieved from the Internet: <URL: https://developer.ibm.com/articles/au-tcpsystemcalls/#>.

(Continued)

*Primary Examiner* — Kent Krueger
(74) *Attorney, Agent, or Firm* — Dan Housley; Andrew M. Calderon; Calderon Safran & Cole, P.C.

(57) ABSTRACT

A computer-implemented method for protecting a processing environment from malicious incoming network traffic may be provided. The method comprises: in response to receiving incoming network traffic comprising a data packet, performing a packet and traffic analysis of the data packet to determine whether said data packet is non-malicious and malicious, and processing of the data packet in a sandbox environment. Furthermore, the method comprises: in response to detecting that the data packet is non-malicious based on the packet and traffic analysis, releasing the processed data packet from the sandbox environment for further processing in the processing environment, and in response to detecting that the data packet is malicious based on the packet and traffic analysis discarding the data packet.

20 Claims, 8 Drawing Sheets

(51) Int. Cl.
  *H04L 47/31* (2022.01)
  *H04L 47/32* (2022.01)
  *H04L 49/9005* (2022.01)
  *H04L 41/14* (2022.01)

(52) U.S. Cl.
  CPC .............. *H04L 47/31* (2013.01); *H04L 47/32* (2013.01); *H04L 49/9005* (2013.01)

(56) References Cited

U.S. PATENT DOCUMENTS

| | | |
|---|---|---|
| 9,430,646 B1 | 8/2016 | Mushtaq et al. |
| 9,565,120 B2 | 2/2017 | Levy et al. |
| 9,917,747 B2 | 3/2018 | Armstrong et al. |
| 10,419,396 B2 | 9/2019 | Bangalore Krishnamurthy |
| 10,432,528 B2 | 10/2019 | Cortes Gomez |
| 10,614,213 B1 | 4/2020 | Demsey et al. |
| 2015/0256431 A1 | 9/2015 | Buchanan et al. |
| 2017/0310692 A1 | 10/2017 | Ackerman et al. |

FOREIGN PATENT DOCUMENTS

| | | |
|---|---|---|
| CN | 106845217 | 6/2017 |
| CN | 110737895 | 1/2020 |

OTHER PUBLICATIONS

Wikipedia, "Deep Packet Inspection", The Free Encyclopedia, 13 pages, Retrieved from the Internet: <URL: https:1/en.wikipedia.org/wiki/Deep_packet_inspection>.

Wikipedia, "Intrusion Detection System", The Free Encyclopedia, 13 pages, Retrieved from the Internet: <URL: https:1/en.wikipedia.org/wiki/Intrusion_detection_system>.

Wikipedia, "Yara", The Free Encyclopedia, 2 pages, Retrieved from the Internet <URL: https:1/en.wikipedia.org/wiki/YARA>.

International Searching Authority, "Notification of Transmittal of the International Search Report and the Written Opinion of the International Searching Authority, or Declaration," Patent Cooperation Treaty, Jul. 15, 2021, 7 Pages, International Application No. PCT/IB2021/053038.

Udupi, et al., "Deep Packet Analysis," Application and Drawings, Filed on Apr. 13, 2021, 36 Pages, Related U.S. Patent Application Serial No. PCT/IB2021/053038.

```
┌─────────────────────────────────────────┐
│ 102 In response to receiving the incoming│
│ network traffic comprising a data packet │
│  ┌───────────────────────────────────┐  │
│  │ 104   performing a packet and     │  │
│  │       traffic analysis            │  │
│  └───────────────────────────────────┘  │
│  ┌───────────────────────────────────┐  │
│  │ 106   performing a processing of  │  │
│  │       the data packet in a sandbox│  │
│  └───────────────────────────────────┘  │
└─────────────────────────────────────────┘
                    │
                    ▼
┌─────────────────────────────────────────┐
│ 108 In response to determining that the │
│ data packet is non-malicious based on   │
│ the packet and traffic analysis         │
│  ┌───────────────────────────────────┐  │
│  │ 110   releasing the processed     │  │
│  │       data packet from the        │  │
│  │       sandbox environment         │  │
│  └───────────────────────────────────┘  │
└─────────────────────────────────────────┘
                    │
                    ▼
┌─────────────────────────────────────────┐
│ 112 In response to determining that the │
│ data packet is malicious based on the   │
│ packet and traffic analysis             │
│  ┌───────────────────────────────────┐  │
│  │ 114   discarding the data packet  │  │
│  └───────────────────────────────────┘  │
└─────────────────────────────────────────┘
```

FIG. 1

DEEP PACKET ANALYSIS

BACKGROUND

The invention relates generally to securing network attached devices, and more specifically, to a computer-implemented method for protecting a processing environment from malicious incoming network traffic. The invention relates further to a system and a computer program product for protecting a processing environment from malicious incoming network traffic.

Network security has primarily used edge devices such as firewalls and network security appliances to analyze and manage data flows and detect/prevent security breach attempts. While multi-staged security, e.g., deployed endpoint protection, has proliferated over the last few years, edge devices still perform the first line of defense against security attacks.

SUMMARY

According to one embodiment, a computer-implemented method for protecting a processing environment from malicious incoming network traffic may be provided. The method may comprise: in response to receiving incoming network traffic comprising a data packet, performing a packet and traffic analysis of the data packet to determine whether said data packet is non-malicious and malicious, and processing the data packet in a sandbox environment. The method may further comprise: in response to detecting that the data packet is non-malicious based on the packet and traffic analysis, releasing the processed data packet from the sandbox environment for further processing in the processing environment, and in response to detecting that the data packet is malicious based on the traffic and packet analysis, the method may comprise discarding the data packet.

According to one embodiment, a computer system for protecting a processing environment from malicious incoming network traffic may be provided. The system may comprise a network analysis engine that: in response to receiving incoming network traffic comprising a data packet, performs a packet and traffic analysis of the data packet to determine whether said data packet is non-malicious and malicious, wherein the computing environment processes the data packet in a sandbox environment. Additionally, the network analysis engine may: in response to detecting that the data packet is non-malicious based on the packet and traffic analysis, releases the processed data packet from the sandbox environment for further processing in the processing environment. Furthermore, the network analysis engine may: in response to detecting that the data packet is malicious based on the packet and traffic analysis, discard the data packet.

According to one embodiment, a computer program product for protecting a processing environment from malicious incoming network traffic may be provided. The computer program product may comprise: in response to receiving incoming network traffic comprising a data packet, performing a packet and traffic analysis of the data packet to determine whether said data packet is non-malicious and malicious, and processing of the data packet in a sandbox environment. The a computer program product may further comprise: in response to detecting that the data packet is non-malicious based on the packet and traffic analysis, releasing the processed data packet from the sandbox environment for further processing in the processing environment, and in response to detecting that the data packet is malicious based on the traffic and packet analysis, the method may comprise discarding the data packet.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document The aspects defined above, and further aspects of the present embodiment, are apparent from the examples of embodiments to be described hereinafter and are explained with reference to the examples of embodiments, but to which the invention is not limited.

Preferred embodiments of the invention will be described, by way of example only, and with reference to the following drawings:

FIG. 1 shows a block diagram of an embodiment of the inventive computer-implemented method for protecting a processing environment from malicious incoming network traffic.

DETAILED DESCRIPTION

Figure 2:
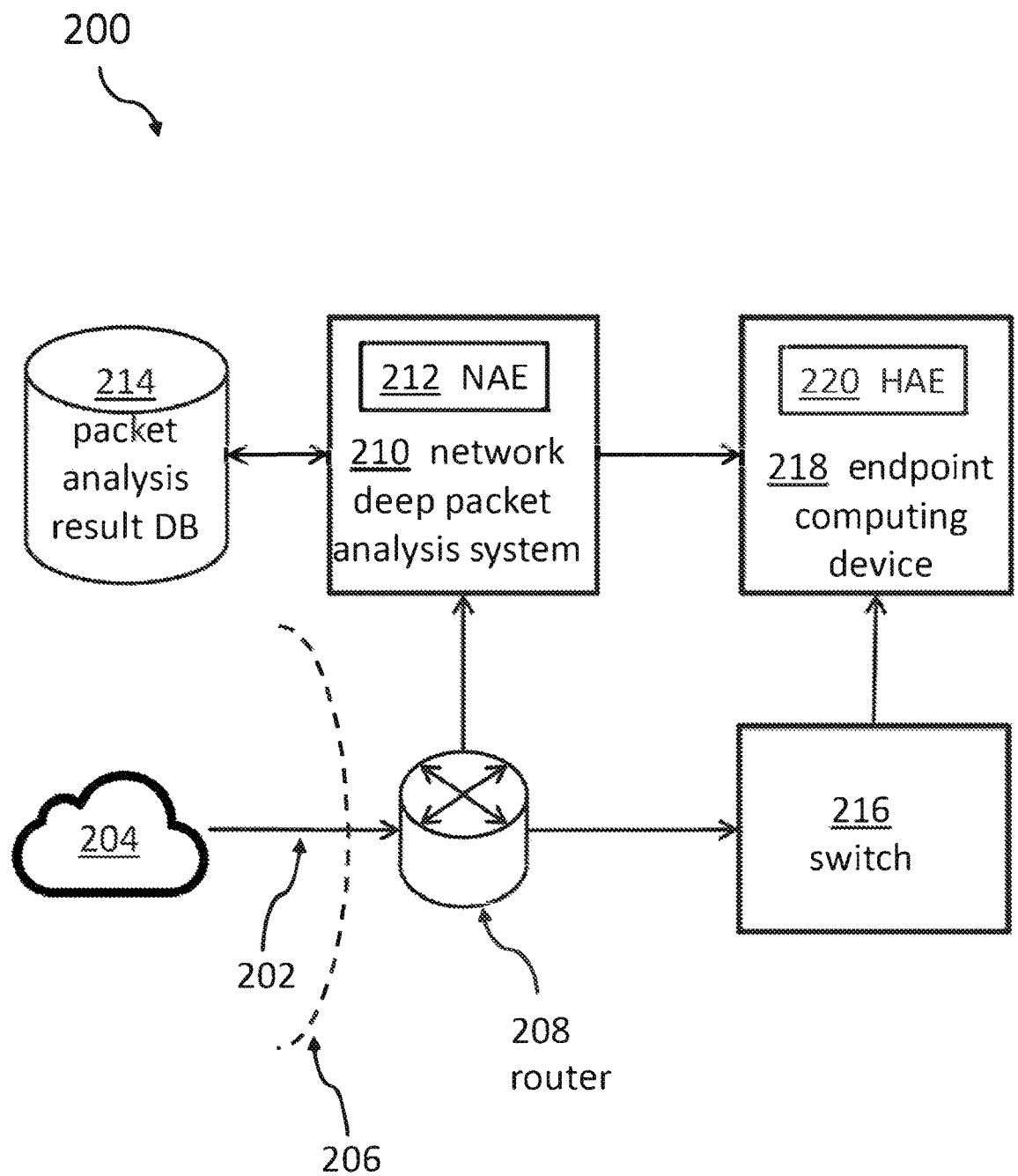
FIG. 2 shows a block diagram of an embodiment of an architecture of the here proposed security environment.

In the context of this description, the following conventions, terms and/or expressions may be used:

The term 'processing environment' may denote a computing system in, e.g., an enterprise network which may be connected, e.g., via a router and/or a network security engine to a public network, e.g., the Internet. The computing system may also be denoted as endpoint computing device. Alternatively, it may denote an application receiving network data packets for processing.

The term 'malicious incoming network traffic' may denote one or more data packets being received from a public network (e.g., the Internet) to be directed to a network device of an in-house network. The data packets may at least in parts be dangerous—e.g., malware—for the in-house information technology infrastructure, i.e., endpoint devices, routers, control units, storage systems, and the like. The kind of attack is not important in the context of this document. However, as examples, computer viruses, ransomware software, espionage code, and other forms of malware, should be mentioned.

The term 'data packet' may denote an amount of data being transmitted, or to be transmitted, over a network. Typical network protocols transmit large amounts of data in data packets which are defined as part of the transmission protocol (i.e., packet-oriented transmission).

The term 'packet and traffic analysis' may denote the process of an inspection of a data packet in terms of malicious content. The inspection may determine a specific signature as part of a packet, a suspicious sending address, and so on. The goal of packet and traffic analysis, typically performed in a network analysis engine contained in a network deep packet analysis system, is to detect malicious incoming network traffic to prevent such data packets from being sent to an endpoint device in the home network.

The term 'sandbox environment' may denote a secured and contained, typically virtual, framework allowing an execution of program code without influencing the underlying computing system and operating system.

The term 'endpoint computing device' may denote any device being connected to a company-internal network being protected against malicious data received over a public network.

The term 'unknown source' may denote an origin of a data packet for which the sender is an unknown entity with an unknown name and/or an unknown network identifier. In contrast, the term 'known network traffic source' may denote an origin of a data packet for which the sender is an already known entity. Traffic may have been received earlier from this address and it shall have been marked as non-malicious.

The term 'stream of packets' may denote a more or less uninterrupted stream of concatenated data packets—related or unrelated to each other—which may be received at a central contact point between a public network and an in-house network. However, a data stream or stream of packets may also be transmitted inside the in-house network.

The term 'dynamic caching buffer' may denote a storage area in a computing device—e.g., the endpoint computing device or the network analysis engine as part of the network deep packet analysis system—which may change in size depending on the number of data packets requiring buffering and free resources in the computing device. In this context, the expression 'dynamic buffer' may comprise a first portion and a second portion. It may describe that the buffer may be partitioned into distinct address spaces which may buffer data of different types. E.g., one of the two portions may buffer data packets from known data sources and the other one of the two portions of the dynamic caching buffer may buffer data packets from unknown data sources.

This also creates a problem in that devices become a primary bottleneck for all network traffic and processing requirements continue to increase to handle a bandwidth of 40 Gb/s or even 100. Deploying adequate defenses, especially one also using deep-analysis of large data quantities requires using hardware with fast CPUs, large amounts of memory and SSD-powered storage, adding considerable costs to every network setup.

In addition to the sheer increase in traffic volumes, security attacks have become more complex, oftentimes requiring examination of large payloads received over the network. The past has shown that attackers will otherwise specifically craft attacks to saturate the security devices, enabling them to sneak the payload past the gatekeeper.

Finally, most of the traffic to be examined is benign. Meaning that in most cases over 99% of the analyze data packets are classified to be harmless and the time expended to analyze them to be essentially wasted.

All in all, this causes modern security devices to become the central bottleneck, needing to keep up with insane volumes of tracking, having to capture and contain large payloads for analysis and only getting miniscule response from it.

However, the knowledge of the state-of-the-art does not solve the problem that the network analyzers represent a bottleneck in the flow of information from the network to an endpoint device. Thus, it may be an objective of the proposed concept to enable a fast information flow from the network to the endpoint device and guarantee data security at the same time.

As such, it may be advantageous, among other things, to provide a method, computer system, and computer program product for protecting a processing environment from malicious incoming network traffic may offer multiple advantages, contributions and technical effects:

The present embodiment may optimize deep packet inspection (DPI), or synonymously, deep packet analysis (DPA), which may combine the functionality of an NIDS/NIPS (network intrusion detection system/network intrusion protection system) and a firewall, in the meaning that upon a detection of malicious traffic, the traffic is dropped.

The present embodiment may also distribute the deep packet analysis between a network analysis engine and host-based analysis engine to (i) cache incoming data packets until the network analysis engine may have completed the deep packet analysis, and (ii), at the same time, the network analysis engine inside a network deep packet analysis system may not become a bottleneck for retransmitting incoming data packets to an endpoint device.

Hence, the present embodiment may reduce the network packet analysis latency introduced by an in-line network security appliance. The present embodiment may also reduce the load on the host analysis engine by performing deep packet analysis by a group of dedicated network deep packet analysis appliances which may work in parallel.

Additionally, the present embodiment may also allow a further enhancement by introducing dynamic buffer capability at least at the host analysis engine to categorize and process different application and network traffic based on application and its network traffic behavior.

The present embodiment may also introduce a workflow to retroactively detect and terminate a chain of network traffic and processes triggered by malicious network traffic. Overall, security for endpoint devices or endpoint processing environments in general may be enhanced and network latency due to security inspections can be reduced significantly.

In the present embodiment it is not required that the host analyzing systems perform the complete analysis on the endpoint as it is done in traditional systems. The disadvantages of the traditions approach can now be overcome, namely, (i) the work load required for the analysis is put solely on devices (servers and workstations) which are on a hardware level not optimized for this task, and (ii) network traffic relayed to n endpoints is analyzed n times instead of once on the network analysis engine. In contrast with the here proposed concept, the host analysis engine may only cache the network packets and will not perform a complete packet analysis of the network traffic, because following the method, the deep packet analysis task may be assigned by the network appliance and may wait for feedback from the network analysis engine on the network packet analysis. Hence, the burden of the packet analysis process may be dynamically adjusted or balanced—i.e., each component working on a part of the analysis—between the network analysis engine and the host analysis engine, the CPU and memory resource consumption may be reduced significantly on the host analysis engine to decrypt the network packet payload and perform analysis.

A further advantage of the present embodiment lies in the following: by selecting only one data packet—e.g., the first or one of the first data packets—from a continuous stream of packets for a deep analysis by the network analysis engine and letting the other received data packets directly pass to the host—i.e., the endpoint device—the host may be used as an intermediate buffer for the complete set of correlated data packets. In other words, the selected data packet undergoing the deep analysis in the network analysis engine may be held back in the network analysis engine for an execution of the complete set of data packets by the endpoint device. The endpoint device may determine that the received set of data packets is incomplete and an execution is not triggered until the last data packet arrived from the network analysis engine. This way of parallelization may save valuable transmission time, and by way of a parallel deep analysis of a representative packet, security may be enhanced. If the missing data packet may not arrive within a predefined time, the complete set of data packets may be discarded and harm, in the form of malware, may be prevented from the endpoint system.

Additionally, by splitting the tasks between network analysis engine and the host analysis engine, it may also become possible to set a QoS (quality of service) flag to actively throttle traffic to a given host system, allowing the deep packet analysis system (i.e., the network analysis engine) more time for an analysis while other data packets are already being routed to the host system.

In the following, additional embodiments—applicable to the method as well as to the related system—will be described:

According to one embodiment of the method, discarding the data packet may also comprise discarding results of the processing of the data packet in the sandbox environment. Thus, no dangerous side effects may happen, after the experimental processing and the sandbox has stopped.

According to one embodiment of the method, an incoming network traffic data packet may be directed in parallel to a network deep packet analysis system and an endpoint computing device. A router connected in between a public network and an in-house network may be configured to allow such a split of the incoming data stream. Alternatively, the network deep packet analysis system may be configured to route the incoming data packet directly to the endpoint computing device, while, at the same time, performing the deep packet analysis. This way, the network deep packet analysis system may not represent a bottleneck for the flow of data from the public network to the endpoint device. However, because of the special handling of the data packet in the network deep packet analysis system and the endpoint device (e.g., sandboxing) it may be ensured, that no malicious data may become dangerous for the endpoint device.

According to another advantageous embodiment, the method may also comprise: upon determining that the data packet may be received from an unknown source, caching of the data packet at the endpoint computing device, and suspending the processing of the data packet. This way, even malicious content (e.g., malware) of data packets may not become dangerous for the endpoint device because no processing may happen. The processing of the data packet may start when a signal may have been received from the network deep packet analysis system that no malicious content is present in the data packet.

Hence, according to another embodiment, the method may also comprise processing the data packet and ending the suppression of the processing in the endpoint computing device—i.e., not any longer in the sandbox environment—after a signal indicating that the data packet is non-malicious has been received by the endpoint computing device. Thus, the network deep packet analysis system and the endpoint computing device work in cooperation in order to prevent that malicious content may be processed in the endpoint computing device and that the network deep packet analysis system will not become a bottleneck for the flow of data.

Consequently, and according to an embodiment of the method, processing of the data packet in a sandbox environment may only be performed for data packets from known network traffic sources. In turn, data received from known sources may be processed immediately in the regular processing environment—i.e., not in the sandbox environment—and simply trusting the source of the data packet.

According to one optional embodiment of the method, the incoming network traffic may be a stream of packets and the data packet may be selected out of the stream of packets. Therefore, a concatenated stream of data packets from the same source may not be required to be inspected and analyzed one by one, but only selected ones of the data packets of a stream from the same source may be analyzed. This may reduce the effort and time required for inspection by the network deep packet analysis system.

Consequently, and according to another embodiment of the method, packets of the stream of packets that are not selected to be the data packet—in particular from the same data stream—may be processed by the endpoint computing environment immediately.

According to a further embodiment, the method may also comprise suppressing a data packet retransmission request of the data packet until the traffic and packet analysis is completed resulting in the data packet not deemed to be malicious. This may prevent an uncontrolled spreading of malicious data packets in a network and to further endpoint devices.

According to another embodiment of the method, the processing environment, in particular an endpoint computer, and/or a network analysis engine, that performs the packet and traffic analysis, may each comprise a dynamic caching buffer. Such a dynamic caching buffer may grow in size if required and if the processing environment resources allows it. On the other side, if the resources of the dynamic caching buffer are not required, the related resources may be freed up and may be used for the core tasks of the endpoint computer system.

According to an enhanced embodiment of the method, the dynamic buffer may comprise a first portion and a second portion. Thereby, the first portion may be reserved for data packets from known sources, and the second portion may be reserved for data packets from unknown sources—or, vice versa. Thus, data packets having a higher probability of being malicious may be separated from data packets from known sources in the buffer for incoming data packets. If a buffer overflow may happen, the data from the known sources may be kept, while the data from unknown data sources may simply be deleted from the buffer. Alternatively—and without the requirement to separate the buffer into distinct portions—a single buffer may be used, and the received data packets may be associated with a flag indicating whether they originate from known or unknown data sources. This may allow an even more dynamic behavior.

In the following, a detailed description of the figures will be given. All instructions in the figures are schematic. Firstly, a block diagram of an embodiment of the inventive computer-implemented method for protecting a processing environment from malicious incoming network traffic is given. Afterwards, further embodiments, as well as embodiments of the system for protecting a processing environment from malicious incoming network traffic, will be described.

FIG. 1 shows a block diagram 100 of an embodiment of the computer-implemented method, system, and computer program product for protecting a processing environment from malicious incoming network traffic. The method, system, and computer program product comprises: at 102, in response to receiving incoming network traffic comprising a data packet, performing, at 104, a packet and traffic analysis of the data packet—in particular, an intensive analysis by the network analysis engine in order to determine malicious content and performing, at 106, —in particular in parallel—a processing of the data packet in a sandbox environment, in particular, in a sandbox environment of the endpoint device.

The method, system, and computer program product also comprises: at 108, in response to detecting that the data packet is non-malicious based on the packet and traffic analysis, releasing, at 110, the processed data packet from the sandbox environment for further processing in the processing environment, and in response to detecting that the data packet is malicious based on the packet and traffic analysis, 112, discarding, 114, the data packet. This deletion process may at least be performed in the sandbox environment. In the other case (i.e., in the non-malicious case), the results and data transformation performed in the sandbox environment may be used during the further processing.

FIG. 2 shows a block diagram of an embodiment of an architecture 200 of the security environment. Network traffic 202 arriving from a public network 204 at a company's technical border 206 is received via a router 208. The network traffic 202 arrives in packets or data packets according to a network protocol. The network packets are not blocked by the network deep packet analysis system 210. The endpoint, (e.g., an application server, a user workstation, and endpoint computing device) however, will not process and initiate the execution of processing the network packet in an unrestricted manner. Either the packets are cached, or the processing of network packets is restricted in such a way that a deletion of results rollback is possible (e.g. in a sandbox environment) until the network deep packet analysis system 210 completes the analysis and provides positive or negative confirmation for the process execution.

Therefore, the router 208 sends the data out to the network deep packet analysis system comprising the network analysis engine 212 which receives information about potentially malicious data packets from the packet analysis result database 214. In parallel, the router 208 sends the data packet, e.g., via switch 216 to the endpoint 218. This endpoint 218 may be an endpoint computing device 218 (other examples, see above). In this endpoint 218, also the host analysis engine 220 is available for handling the data packets in the appropriate way. Alternatively, the network deep packet analysis system may be equipped with a by-pass to transmit the data packets directly to the endpoint device.

Figure 3:
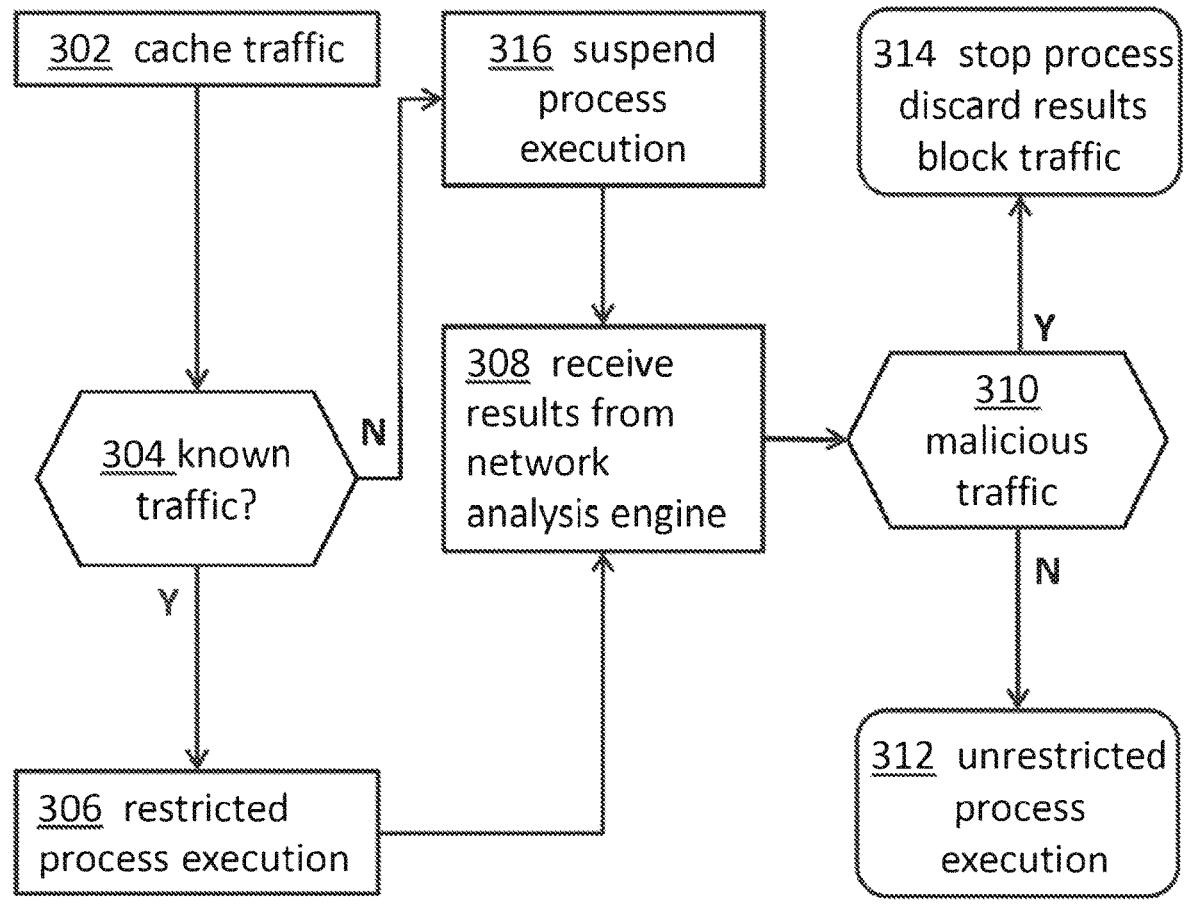
FIG. 3 shows an exemplary basic flowchart illustrating the functioning of the units, shown in FIG. 2.

FIG. 3 shows an exemplary basic flowchart 300 illustrating the functioning of the units shown in FIG. 2. The process starts with caching 302 the network traffic. The determination 304 checks whether the network traffic originates from a known source. If that is true—case "Y"—the process continues with an allowed restricted process execution 306 in the endpoint device. For this, results are received from the network analysis engine (NAE 212, compare FIG. 2). In a next step, it is determined, 310, whether the data packet comprises malicious data traffic. If that is not true—case "N"—an unrestricted process execution may happen, 312. However, if the last determination results in a "true"—case "Y"—the execution process is stopped, a deletion of results is initiated and the network traffic is blocked, 314.

If during the determination 304 it is determined that the data source is not known—case "N"—the process execution is suspended, at 316, before the activity flow continues to the receiving 308 of the results from the network analysis engine.

It may be noted that this flowchart is a condensed version of a more sophisticated real data and process flow which will be discussed in the context of FIGS. 5 to 7 for the network analysis engine (NAE 212, compare FIG. 2) and the host analysis engine (HAE 220, compare FIG. 2).

Figure 4:
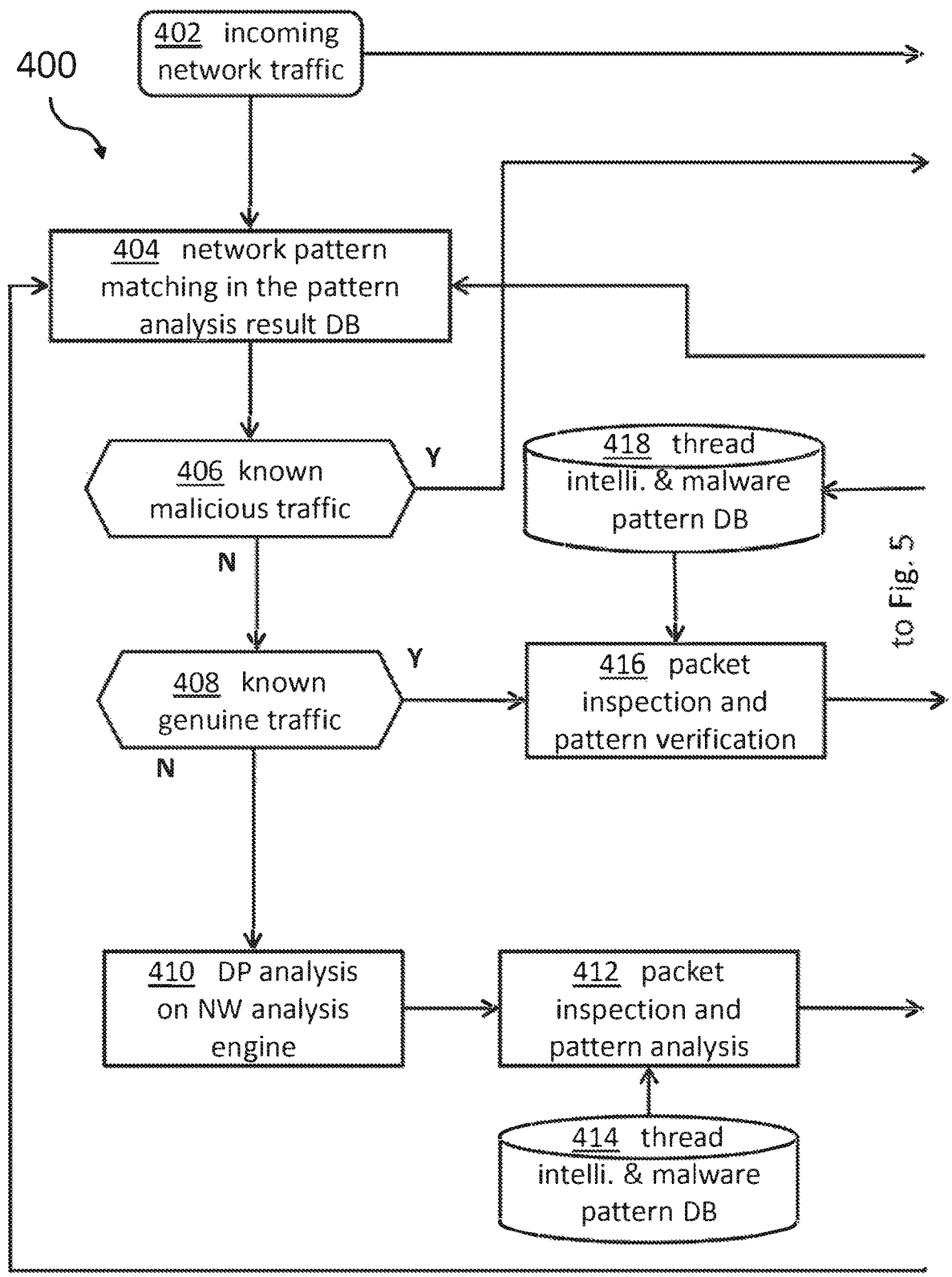
FIG. 4 shows a first part of exemplary flowchart highlighting the new functions of the proposed concept and how it is embedded in the state-of-the-art techniques on the side of the network analysis engine.

FIG. 4 shows an exemplary flowchart 400 highlighting the new functions of the proposed concept and how it is embedded in the state-of-the-art techniques on the side of the network analysis engine. The incoming network traffic 302 is mirrored to the network analysis engine and a comparison 404 is made weather there is a match in the packet analysis result database. Based on this, it is determined at 406 whether the network traffic is malicious. If that is not true—case "N"—it is determined, 408, whether it is known genuine network traffic. If that is also not true—case "N"—a deep packet analysis is performed, at 410, on the network analysis engine. Part of that is a packet inspection and pattern analysis process, 412. For this, a threat intelligence and malicious pattern information 414 is fed to the packet inspection and pattern analysis process 412 as the basis and reference for the pattern analysis process.

If during the determination 408 regarding known genuine traffic the outcome is positive—case "Y"—a packet inspection and pattern verification step follows, 416. Also here, information from a threat intelligence and malicious pattern store or database is fed to the packet inspection and pattern verification step 416.

Figure 5:
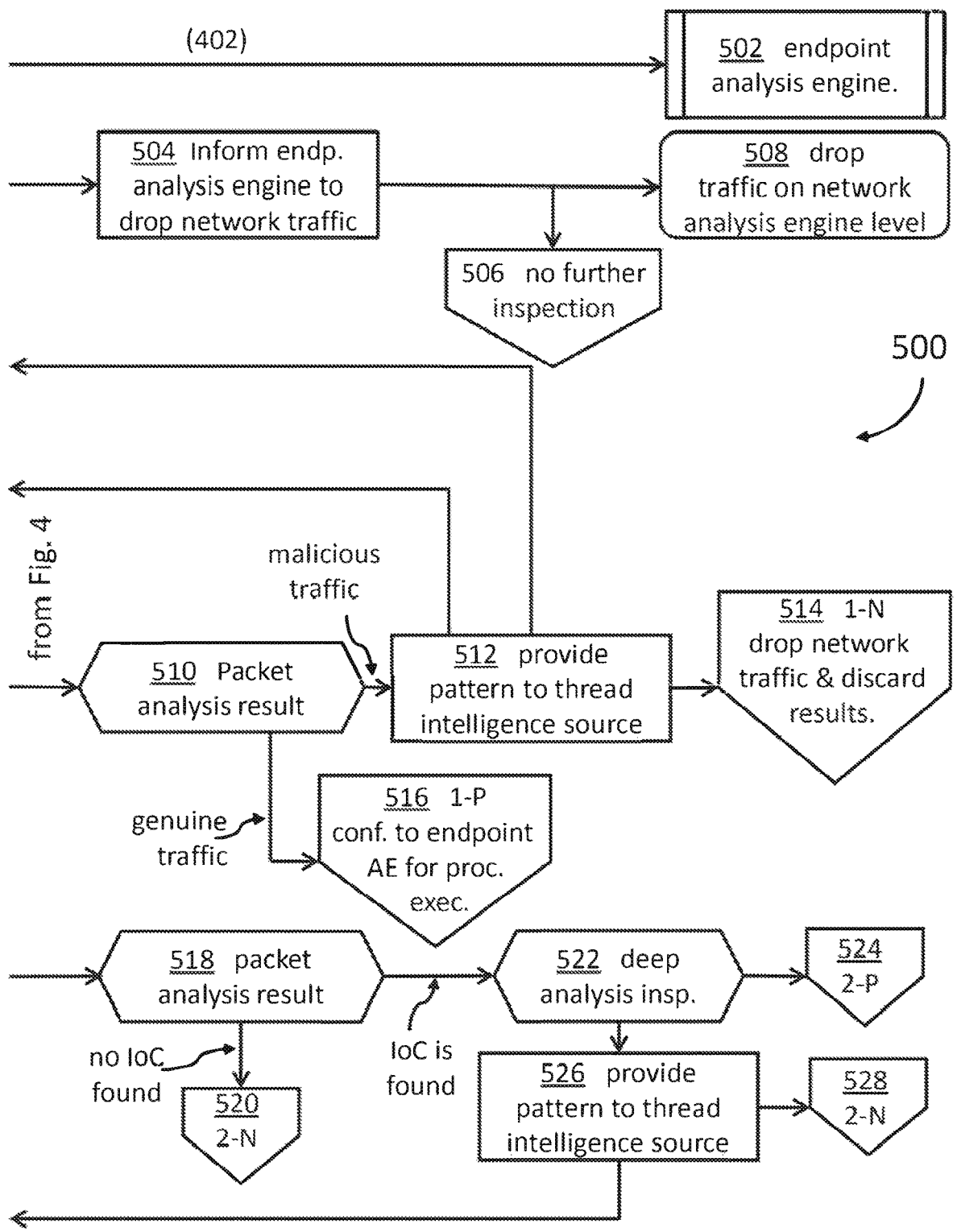
FIG. 5 shows the second part of the exemplary flowchart according to FIG. 4.

It may be noted that the activities described in the context of FIG. 4, represent in some parts state-of-the-art techniques which are enhanced by more sophisticated process steps, described in the context of FIG. 5. It may be noted that there are a couple of open flow connections on the right side of the shown process flow of FIG. 4. However, the process flow arrows continue in FIG. 5 and vice versa. Thus, FIG. 4 and FIG. 5 is an integrated flowchart.

FIG. 5 shows an exemplary flowchart 500 of a host analysis engine process flow in interaction with the network analysis engine, extending the flowchart and the process flow, described in the context of FIG. 4. The lines of the process flow ending on the left side of FIG. 5 continue in the process flow shown in FIG. 4. Thus, FIG. 4 and FIG. 5 is an integrated flowchart.

The incoming network traffic 402 is mirrored, at 502, from the router to the entered analysis engine. Thus, the incoming data packets from the network do not—in contrast to known technologies—run through the network deep packet analysis system to be potentially significantly be delayed but are sent to the endpoint computing system—i.e. the endpoint computing environment—directly.

However, no immediate execution or processing of the incoming data packets is performed at the endpoint computing system. In case of known malicious traffic (from determination 406 of FIG. 4), the endpoint analysis engine is informed (e.g., by a trigger signal), 504, to drop the network traffic. No further inspection 506 happens and the received network traffic/the received data packet is dropped, 508 on the network analysis engine level.

If in determination 408 regarding known genuine traffic determines a positive outcome in which consequence a packet inspection and pattern verification step 416 is performed (compare FIG. 4), the determination regarding the packet analysis results is performed, 510. Consequently, the malicious pattern is provided, 512, to the threat intelligence source (418) and to step 404 regarding a network pattern matching in the packet analysis result database is performed. Additionally, "1-N" the network traffic data are dropped, and a "deleted results" of the application process is signaled, 514 (in particular, to the host analysis engine).

If it is determined at the determination 510 with respect to the packet analysis results that there is genuine traffic, the process continues "1-P" with a confirmation (signal) to the endpoint analysis engine to allow process execution for the received data packet, 516.

After the packet inspection and pattern analysis (412, FIG. 4), the packet analysis system results are checked in the determination 518. If an indicator of compromise (IoC) is found, the process continues with the step "2-N", namely, signaling (to the host analysis engine) to drop the cached network traffic and prevent further application process execution, 520.

If during the determination 518 regarding the packet analysis result no IoC is found, the flow continues with a deep packet inspection 522. In case of genuine traffic, the flow continues with an enablement of further process execution for analyze traffic at the endpoint analysis engine ("2-P"), 524. If, on the other side, malicious traffic is determined, the pattern is provided, 526, to the threat intelligence source (back to FIG. 4). Additionally, "2-N", the cached network traffic is dropped and a further application process execution is prevented, 528.

In other words, the network analysis engine process flow can also be described as follows:
1. The traffic is received at the network analysis engine, where the network analysis engine will forward the traffic to the endpoint and further start the network analysis workflow.
2. The network analysis engine will check if the traffic contains known patterns from previously observed application traffic.
    a) If yes, the packet bypasses the deep packet inspection and is processed for pattern and packet inspection and verification.
    b) If no, the packet is processed by deep packet analysis process workflow.
3. The packet inspection and pattern verification will check the network packet with external threat intelligence data base for indicators of compromise (IoC) and match the network traffic patterns against known malicious patterns. These techniques are known from prior-art.
    a) If the threat intelligence check provided a detection of IoC, the distributed endpoint analysis engine will receive a command to drop cached network traffic and prevent further process execution for identified malicious traffic.
    b) If IoCs are detected for known application traffic, the distributed endpoint analysis engine will receive a command to process the cached network traffic and start the process execution.
4. For new network traffic detected, further workflow for deep packet inspection is triggered. The network traffic will be decrypted and checked against YARA rules (which is a modelling and description language for an identification and classification of malware) and other known malware patterns and signatures.
    a) If the deep packet inspection has positive detection on malicious pattern, the distributed endpoint analysis engine will receive a command to drop cached network traffic and prevent further process execution for identified malicious traffic.
    b) If the deep packet inspection does not detect a malicious pattern, the distributed endpoint analysis engine will receive a message to process the cached network traffic and start the process execution.
5. End of distributed network analysis process by sending trigger messages to distributed endpoint analysis engine.

Figure 6:
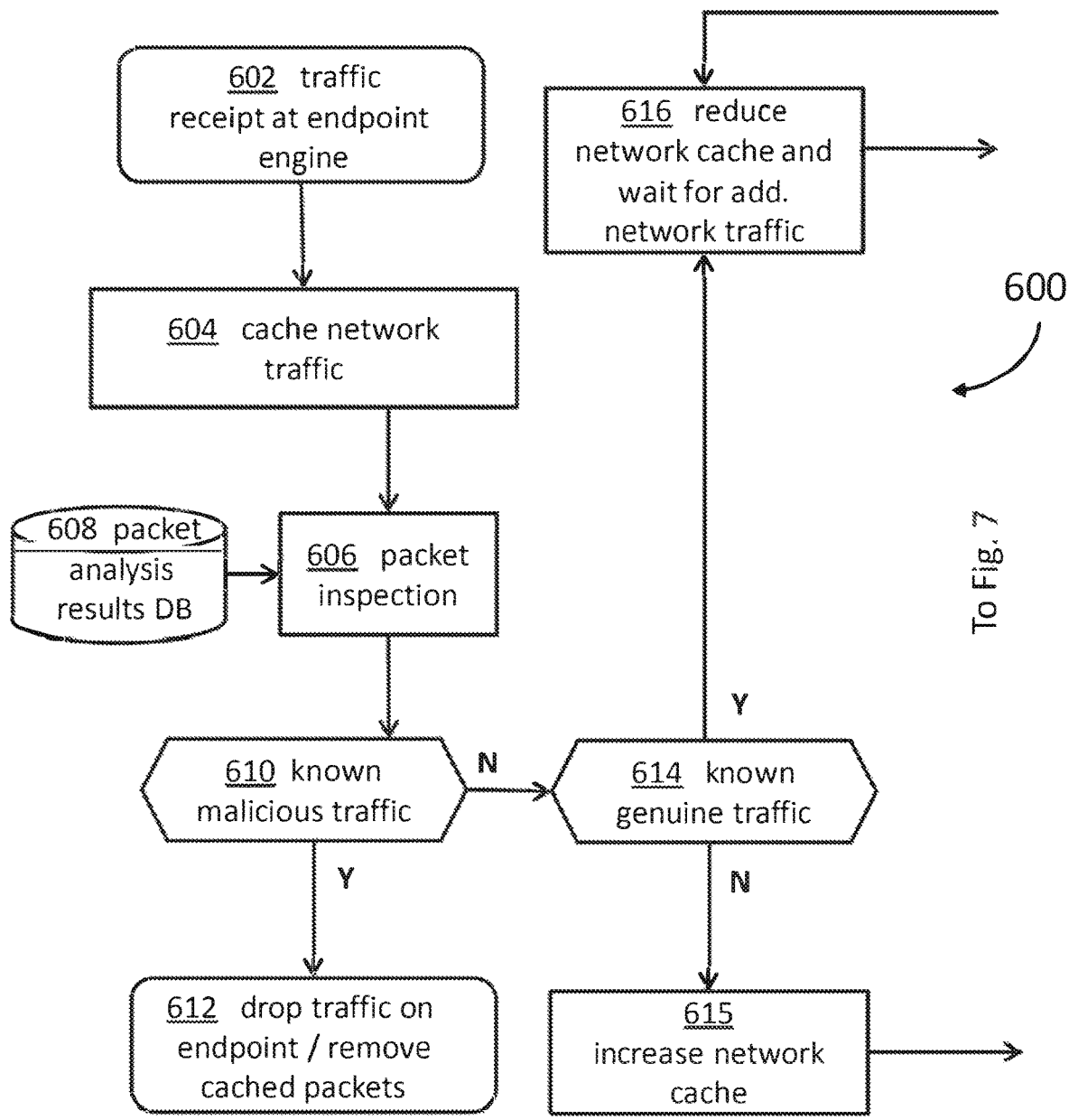
FIG. 6 shows an exemplary flowchart for the host analysis engine process in interaction with the network analysis engine flow.

FIG. 6 shows an exemplary flowchart 600 for the host analysis engine process in interaction with the network analysis engine flow. The flow starts with receiving, 602, the network traffic at the endpoint analysis engine. Here, the network traffic is cached, 604. Then, a packet inspection 606 is performed with the packet analysis results database 608 (equivalent to the packet analysis results database, mentioned before with other reference numerals). It is determined, 610, whether it is known malicious traffic. If that is true—case "Y"—the network traffic is dropped on the endpoint computing device and the cached data packet is removed, 612.

If the determination 610 regarding known malicious traffic has a negative result—case "N"—the process flow continues with a determination 614 regarding known genuine traffic. If that is not true—case "N"—the network cache is increased, 615, and the process flow continues on FIG. 7.

If the result of the determination 614 regarding known genuine traffic is positive—case "Y"—the network cache is reduced in size and additional network traffic is awaited, 616. The process flow continues on FIG. 7.

Figure 7:
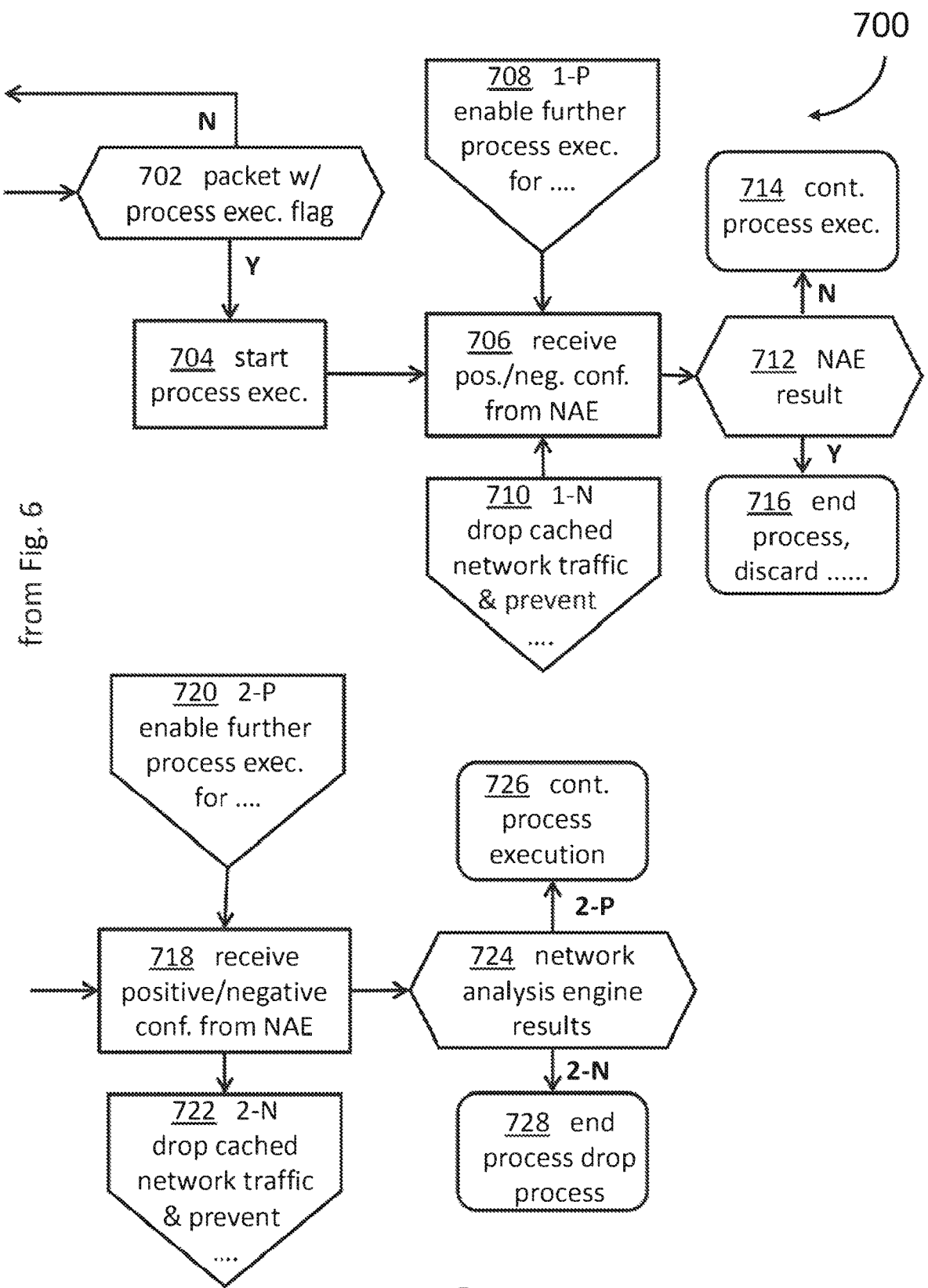
FIG. 7 shows the second part of the exemplary flowchart according to FIG. 6.

FIG. 7 shows the second part 700 of the exemplary flowchart according to FIG. 6. Continuing from FIG. 6, it is determined, 702, whether it is a packet with the process execution flag. If that is not true—case "N"—the process flow returns back to FIG. 6, step 616. However, if in contrast, the determination 702 has a positive result—case "Y"—the process execution starts, 704. It continues with receiving, 706, positive/negative confirmation from the network analysis engine.

For this, from signal connection point "1-P" 708 (compare FIG. 5, 516) the confirmation to the endpoint analysis engine to the process execution is received. Otherwise, from signal connection point "1-N" 710 (compare FIG. 5, 514) the signal indicating to drop the network traffic and delete the results of the (sandboxed) application process execution is received.

In both cases, the process flow continues with a determination 712 regarding the network analysis engine result. In case of 1-P, the process execution continues, 714. In case of "1-N", the process ends, the process results are discarded, and the network traffic is dropped, 716.

In the case of an increasing network cache (compare 616, FIG. 6), a positive/negative confirmation signal is received from the network analysis engine, 718. In case of "2-P" (compare FIG. 5), it is signaled to enable further process execution for analyze traffic at the endpoint analysis engine, 720. Otherwise, from "2-N" (compare FIG. 5) it is signaled, 722, to drop the cached network traffic in order to prevent further application process execution.

The network analysis engine results are investigated, 724, and in case of "2-P", the process execution in the endpoint device is continued 726. In the other case, "2-N" the process is stopped, and the network traffic is dropped, 728.

In other words, the activities, described in the context of FIG. 6 and FIG. 7, may be summarized as:

1. The packets are received by the host analysis engine.
2. The host analysis engine will start caching the network traffic and trigger the packet analysis.
3. The host analysis engine checks if the network traffic is known application traffic.
   a) If yes, it assigns are reduced network cache segment to this traffic and waits for additional network traffic.
   b) If no, it assigns a larger network cache segment to this traffic and does not trigger process execution for the network traffic on the endpoint device.
4. For known application traffic, once the network packet with soconnect( ) system call is received, the host endpoint analysis engine will allow starting process execution and monitoring the process, additionally waiting for the network analysis engine for confirmation to endpoint analysis engine about the network traffic being genuine or "drop network traffic" command to the host analysis engine. It may be noted that the soconnect( ) function is equivalent to the connect(2) system call, and initiates a connection on the socket so to the address nam.
   a) If a positive confirmation from the network analysis engine is received, then the process is fully executed.
   b) The process behavior is monitored by distributed endpoint analysis engine. This is used to detect zero-day attacks where it might have passed through the system, and when there is a new signature released, the process and hashes of files are available for analysis.
   c) If the drop network traffic signal is received, then the process results are discarded by the host analysis engine and the related remaining network traffic is blocked.
5. For unknown traffic the process execution will not be triggered even after receiving the soconnect( ) system call and the workflow will wait for trigger message from network analysis engine for further process execution or to drop the network traffic, similar to workflow described in step 4.

Figure 8:
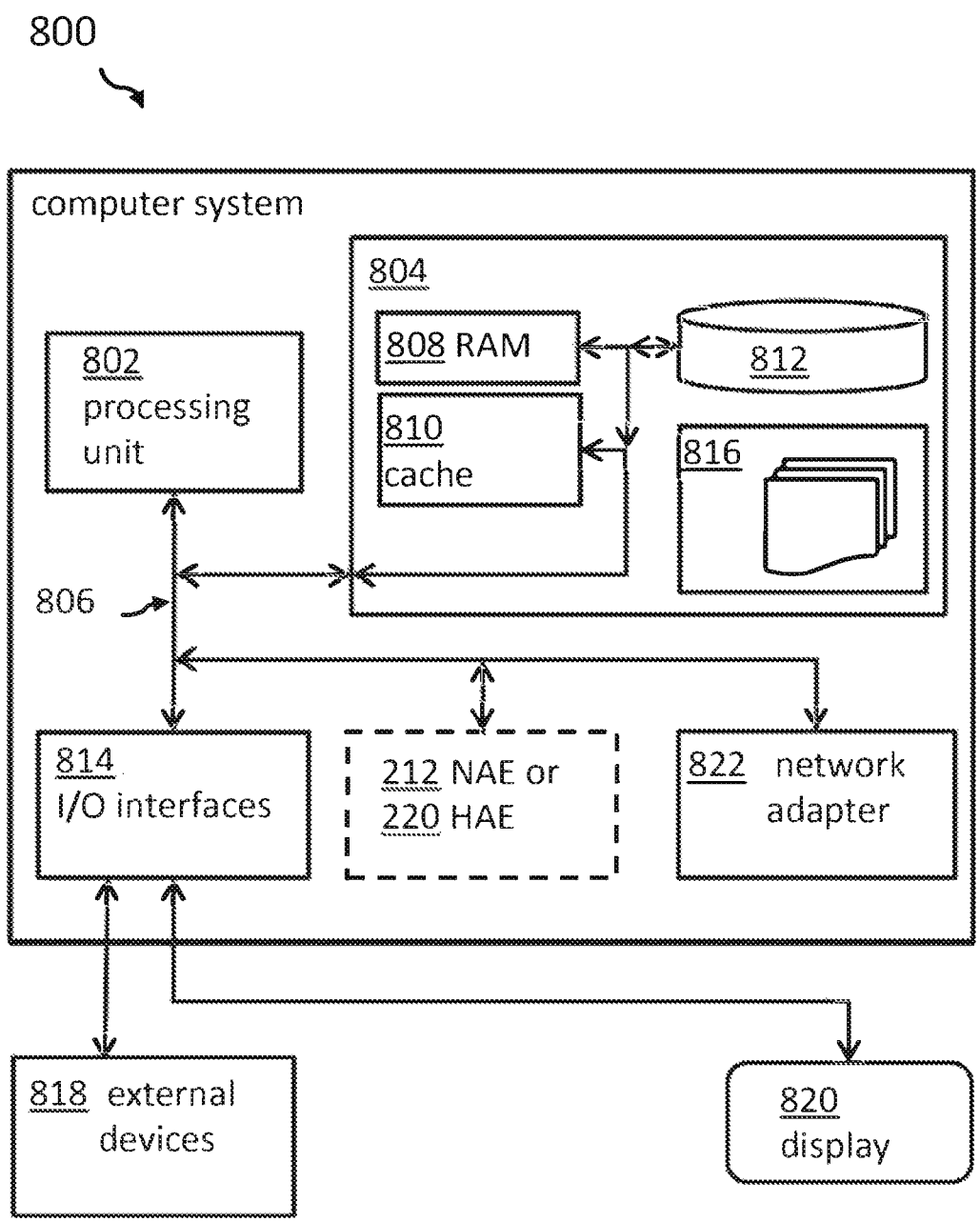
FIG. 8 shows a block diagram of a computing system instrumental for executing at least part of the proposed concept.

Embodiments of the invention may be implemented together with virtually any type of computer, regardless of the platform being suitable for storing and/or executing program code. FIG. 8 shows, as an example, an endpoint computing system suitable for executing program code related to the proposed method. Additionally, also the network packet analysis system may be based on a similar system design. The main difference between the endpoint computing device and the network packet analysis system may be the size of the available cash. It is not seldom that a network packet analysis system has a cache of about 1 TB, while the size of the network cache for the endpoint computing system may only be, e.g., a couple of megabytes.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purposes or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random-access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the network analysis engine 212 system or the host analysis engine may be attached to the bus system 706 (optionally shown with dotted lines).

The descriptions of the various embodiments of the present embodiment have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present embodiment may be embodied as a system, a method, and/or a computer program product. The computer program product may include a computer readable storage medium (or media) having computer readable program instructions thereon for causing a processor to carry out aspects of the present embodiment.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment.

Aspects of the present embodiment are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present embodiment. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present embodiment has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for processing incoming network traffic, said method comprising:
    in response to receiving incoming network traffic comprising a data packet, triggering performance of a packet and traffic analysis of said data packet to determine a state of the data packet, and processing of said data packet in a sandbox environment of an endpoint computing device,
    routing said data packet by a network deep packet analysis system to the endpoint computing device for the processing of said data packet in the sandbox environment in parallel with performing the packet and traffic analysis on said data packet at the network deep packet analysis system; and
    in response to determining said state of the data packet, releasing said processed data packet from said sandbox environment for further processing in said a processing environment.

2. The computer-implemented method according to claim 1, wherein said discarding said data packet further comprises:
    discarding results of said processing of said data packet in said sandbox environment when data packet is malicious; and
    the determining determines whether said data packet is non-malicious.

3. The computer-implemented method according to claim 1, further comprising:
    determining, at the network deep packet analysis system, whether said data packet is received from a known source and an unknown source;
    in response to determining that said data packet is received from the known source, beginning the processing of said data packet and monitoring the processing in the sandbox environment while waiting for results of the packet and traffic analysis; and
    in response to determining that said data packet is received from the unknown source, the endpoint computing device waits for a trigger message from the network deep packet analysis system to trigger the processing of said data packet in the endpoint computing device.

4. The computer-implemented method according to claim 1, further comprising:
    in response to determining that said data packet is received from an unknown source, caching of said data packet at said endpoint computing device, and suspending said processing of said data packet.

5. The computer-implemented method according to claim 4, further comprising:
    processing said data packet in said endpoint computing device after a signal indicating that said data packet is non-malicious has been received.

6. The computer-implemented method according to claim 1, wherein said processing of said data packet in a sandbox environment is only performed for data packets from known network traffic sources.

7. The computer-implemented method according to claim 1, wherein said incoming network traffic is a stream of packets and wherein said data packet is selected out of said stream of packets.

8. The computer-implemented method according to claim 7, wherein packets of said stream of packets that are not selected are processed by said endpoint computing environment.

9. The computer-implemented method according to claim 1, further comprising:
suppressing a data packet retransmission request of said data packet until said traffic and packet analysis is completed resulting in said data packet not deemed to be malicious.

10. The computer-implemented method according to claim 1, wherein said processing environment and a network analysis engine that performs said packet and traffic analysis comprises a dynamic caching buffer, and the dynamic caching buffer associates received data packets with a flag indicating whether the data packets originate from known or unknown data sources.

11. The computer-implemented method according to claim 10, wherein said dynamic caching buffer comprises a first portion and a second portion, wherein said first portion is reserved for data packets from known sources, and wherein said second portion is reserved for data packets from unknown sources,
and in response to a buffer overflow of the dynamic caching buffer, the data packets from known data sources are kept while the data packets from unknown sources are deleted from the dynamic caching buffer.

12. A computer system for processing incoming network traffic, said system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, wherein the computer system is capable of performing a method comprising:
a network analysis engine of a network deep packet analysis system that, in response to receiving incoming network traffic comprising a data packet:
performs a packet and traffic analysis of said data packet to determine whether said data packet is non-malicious, wherein a processing environment processes said data packet in a sandbox environment of an endpoint computing device,
directing said data packet in parallel to the network deep packet analysis system and the sandbox environment of the endpoint computing device to be cached until the packet and traffic analysis is completed;
determining, at the network deep packet analysis system, whether said data packet is received from a known source and an unknown source; and
in response to determining that said data packet is received from the unknown source, the processing of said data packet in the sandbox environment is suspended.

13. The computer system according to claim 12, further comprising detecting that the data packet is malicious based on the packet and traffic analysis and, if malicious, discarding said data packet,
wherein said discarding of said data packet comprises:
discarding results of said processing of said data packet in said sandbox environment.

14. The computer system according to claim 12, further comprising:
determining, at the network deep packet analysis system, whether said data packet is received from a known source and an unknown source;
in response to determining, at the network deep packet analysis system, that said data packet is received from the known source, said data packet bypasses the packet and traffic analysis of the network deep packet analysis system and the processing of said data packet occurs in the processing environment of the endpoint computing device; and
in response to determining, at the network deep packet analysis system, that said data packet is received from the unknown source, the performing of the packet and traffic analysis of said data packet is completed and a trigger message with results of the packet and traffic analysis is sent from the network deep packet analysis system to the endpoint computing device.

15. The computer system according to claim 12, further comprising:
a cache in said endpoint computing device that caches said data packet at said endpoint computing device if that said data packet is received from an unknown source, and wherein said endpoint computing device suspends said processing of said data packet.

16. The computer system according to claim 15, further comprising:
processing said data packet in said endpoint computing device and wherein said endpoint computing device comprises a receiver that receives a signal indicating that said data packet is non-malicious and triggers said processing of said data packet in said endpoint computing device.

17. The computer system according to claim 12, wherein said incoming network traffic is a stream of packets and wherein said data packet is selected out of said stream of packets.

18. The computer system according to claim 17, wherein said endpoint computing environment processes data packets of said stream of packets that are not selected to be said data packet.

19. The computer system according to claim 12, wherein said processing environment and the network analysis engine that performs said packet and traffic analysis comprises a dynamic caching buffer, and wherein said dynamic caching buffer comprises a first portion and a second portion, wherein said first portion is reserved for data packets from known sources, and wherein said second portion is reserved for the data packets from unknown sources,
wherein said dynamic caching buffer of the processing environment grows in size based on an application utilizing the data packets and an application network traffic behavior of the data packets.

20. A computer program product for processing incoming network traffic, said computer program product comprising:
one or more tangible computer-readable storage devices and program instructions stored on at least one of the one or more tangible computer-readable storage devices, the program instructions executable by a processor, the program instructions comprising:

receiving incoming network traffic comprising a complete set of data packets including a data packet and correlated data packets, in response to receiving the incoming network traffic, selecting said data packet for a packet and traffic analysis at a network deep packet analysis system, passing said correlated data packets to an endpoint computing device while performing the packet and traffic analysis of said data packet to determine whether said data packet is non-malicious, wherein said data packet is held at the network deep packet analysis system until the packet and traffic analysis determines said data packet to be non-malicious;

in response to determining said data packet is non-malicious based on the packet and traffic analysis, passing said data packet to the endpoint computing device; and in response to receiving said data packet at the endpoint computing device, executing said complete set of data packets in the endpoint computing device.

* * * * *